US009247727B2

(12) United States Patent
Peterson

(10) Patent No.: US 9,247,727 B2
(45) Date of Patent: Feb. 2, 2016

(54) TIERED-DOMED BLIND

(71) Applicant: Travis Peterson, Houston, TX (US)

(72) Inventor: Travis Peterson, Houston, TX (US)

(*) Notice: Subject to any disclaimer, the term of this patent is extended or adjusted under 35 U.S.C. 154(b) by 0 days.

(21) Appl. No.: 14/494,848

(22) Filed: Sep. 24, 2014

(65) Prior Publication Data
US 2015/0223444 A1 Aug. 13, 2015

Related U.S. Application Data

(60) Provisional application No. 61/881,675, filed on Sep. 24, 2013.

(51) Int. Cl.
A01M 31/02 (2006.01)
E04H 15/00 (2006.01)
E04H 1/12 (2006.01)

(52) U.S. Cl.
CPC .......... *A01M 31/025* (2013.01); *E04H 15/001* (2013.01); *E04H 1/1205* (2013.01)

(58) Field of Classification Search
CPC ..... E04H 1/205; E04H 15/001; E04H 1/1205; A01M 31/025; Y10S 135/901; Y10S 428/919; G21F 7/02; G21F 7/03; G21F 7/031
USPC ................ 135/87, 901; 52/79.1, 79.14, 81.6; 446/476; 428/15
See application file for complete search history.

(56) References Cited

U.S. PATENT DOCUMENTS

| 2,992,503 | A | * | 7/1961 | Webb | 43/1 |
|---|---|---|---|---|---|
| 3,018,857 | A | | 1/1962 | Parham | |
| 3,513,605 | A | * | 5/1970 | Smith | 52/20 |
| 3,836,619 | A | * | 9/1974 | Volent | 264/131 |
| 4,123,869 | A | * | 11/1978 | Witt | 43/1 |
| 4,161,924 | A | * | 7/1979 | Welker | 119/482 |
| RE30,605 | E | * | 5/1981 | Witt | 43/1 |
| 4,372,251 | A | * | 2/1983 | Keith | 119/482 |
| 4,385,088 | A | * | 5/1983 | Baskin | 428/15 |
| 4,668,451 | A | * | 5/1987 | Langson | 264/39 |
| 4,761,908 | A | | 8/1988 | Hayes | |
| 4,940,558 | A | * | 7/1990 | Jarboe et al. | 264/46.7 |
| D339,640 | S | * | 9/1993 | Alberico | D25/16 |
| 5,241,772 | A | * | 9/1993 | Hall | 43/1 |
| 5,443,774 | A | * | 8/1995 | Kluh et al. | 264/130 |
| 5,485,701 | A | * | 1/1996 | Hecht | 52/80.1 |
| D379,522 | S | * | 5/1997 | Rushford et al. | D25/7 |
| 5,791,293 | A | * | 8/1998 | Northrop et al. | 119/498 |
| 5,911,927 | A | * | 6/1999 | Roberts | 264/46.4 |
| 6,033,744 | A | * | 3/2000 | Bright, Sr. | 428/15 |
| 6,131,654 | A | * | 10/2000 | Holscher | 166/79.1 |
| 6,132,820 | A | * | 10/2000 | Callahan | 428/15 |
| 6,248,411 | B1 | * | 6/2001 | Warfel | 428/15 |
| D450,890 | S | * | 11/2001 | Van Buuren | D30/108 |

(Continued)

Primary Examiner — Robert Canfield
(74) Attorney, Agent, or Firm — Patterson Thuente Pedersen, P.A.

(57) ABSTRACT

A wildlife hunting and/or observation blind having tiered-ledges and angled windows to provide a natural landscape element. The blind having earthen materials and/or vegetative material applied to the exterior surface, and the ledges at different levels to provide natural vegetation growth. The blind can be manufactured using a mold comprising a plurality of sides separated by a plurality of progressively tiered ledges providing the tiered-ledged hunting blind. The blind may comprise a plurality of layers to provide the structure, including at least one structural layer located between at least one interior rubber layer and at least one exterior gelcoat layer, the earthen material adhered to the exterior most layer of the hunting blind.

18 Claims, 14 Drawing Sheets

(56) References Cited

U.S. PATENT DOCUMENTS

| | | | | |
|---|---|---|---|---|
| D482,825 S | * | 11/2003 | Guard | D30/112 |
| 7,325,364 B2 | * | 2/2008 | Leininger et al. | 52/169.6 |
| 7,997,291 B2 | | 8/2011 | Gressette, Iii et al. | |
| 8,066,022 B2 | | 11/2011 | Schlipf | |
| D652,995 S | * | 1/2012 | VanBuuren et al. | D30/108 |
| D661,404 S | * | 6/2012 | Thomason et al. | D25/16 |
| 8,756,872 B2 | * | 6/2014 | Preg | 52/65 |
| 8,966,831 B1 | * | 3/2015 | Stoll | 52/79.4 |
| 2003/0121221 A1 | * | 7/2003 | Kress | 52/182 |
| 2003/0230454 A1 | * | 12/2003 | Morgan | 182/178.1 |
| 2005/0028854 A1 | * | 2/2005 | Erickson et al. | 135/97 |
| 2005/0279394 A1 | * | 12/2005 | Leininger et al. | 135/117 |
| 2007/0033854 A1 | * | 2/2007 | Ridge | 43/1 |
| 2008/0084654 A1 | * | 4/2008 | Gerich | 361/601 |
| 2012/0216845 A1 | | 8/2012 | Noll | |
| 2012/0304551 A1 | * | 12/2012 | Preg | 52/65 |

\* cited by examiner

TIERED-DOMED BLIND

RELATED APPLICATION

The present application claims the benefit of U.S. Provisional Application No. 61/881,675, filed Sep. 24, 2013, which is incorporated herein in its entirety by reference.

FIELD OF THE INVENTION

The present invention is directed to a hunting or observation structure used as a blind from natural wildlife, the blind having a tiered structure, and in particular a tiered structure having a natural appearance.

BACKGROUND OF THE INVENTION

Blinds are an integral part of hunting and wildlife observation, and are used to conceal the observer from being seen by the natural wildlife.

There are many forms of blinds. One form is a portable blind covered with camouflage fabric, such as U.S. Pat. Nos. 3,018,857; 4,761,908; and 7,997,291. This form of blind is often lightweight, collapsible, and decorated with a fabric patterned to resemble surrounding vegetation such as sticks and leaves. However, because the blind is portable and collapsible, this type of blind does not provide much protection from inclement weather. In addition, this type of blind is easily detected by larger wildlife. Also, this blind does not prevent the observer's scent from being detected by the natural wildlife. Further, this type of blind is not capable of becoming part of the natural landscape.

Other forms of blinds are designed to mimic structures found in nature, such as US publications 20120216845 and 20050028854, and U.S. Pat. No. 8,066,022. Examples include blinds which resemble a hay bale or tree stump. However, such a blind often requires assembly and does not necessarily provide protection from the elements. While this form of blind is designed to mimic a structure found in nature, the blind does not contain natural elements and cannot truly become part of the natural landscape. As a result, the blind can still be detected by animals.

Therefore, there is a need for blinds that become part of the natural landscape. There is also a need for blinds that provide protection to the occupant from inclement weather, such as rain, sleet, snow, wind and cold temperatures. There is further a need for blinds that help deter wildlife from detecting the scent and/or motion of the occupant.

SUMMARY OF THE INVENTION

The present invention is a blind structure requiring minimal assembly that protects an occupant from inclement weather while also helping to conceal the occupant from being detected by wildlife by sight and/or scent.

The blind of the present invention having an interior area for an occupant and an exterior surface, the exterior surface having progressively tiered ledges, and the blind having one or more windows, a door, or both. In some aspects, the exterior surface has progressively tiered ledges with a domed roof structure.

In some aspects of the present invention, the blind has a natural earthen appearance. In some aspects, the blind has natural earthen material defining at least a portion of an outer surface layer. In some aspects, the blind has dirt, rocks, pebbles, sand or a combination thereof defining at least a portion of an outer surface layer.

In some aspects, natural vegetation is capable of growing on the exterior surface of the structure, such as the tiered ledges, so that the blind becomes part of the natural landscape.

In some aspects, the blind structure comprises a structural layer and an outer surface layer applied to the structural layer.

In some aspects, the structural layer comprises fiberglass. In some other aspects, the structural layer comprises fiberglass having a gelcoat on an outer surface of the fiberglass. In some aspects, the blind structure further comprises an interior layer overlaying an interior surface of the structural layer. In some aspects, the interior layer comprises a rubber layer that overlays an interior surface of the structural layer. In some aspects, the interior layer comprise a rubber layer that overlays the interior surface of the structural layer, the structural layer comprising fiberglass.

In some aspects, the outer surface layer comprises natural earthen material that overlays an outer surface of the structural layer. In some aspects, the outer surface layer comprises natural earthen material that overlays one or more gelcoat layers of the outer surface of the structural layer.

In some aspects, the blind further comprises an insulating layer located on the interior side of the structural layer. In some aspects, the insulating layer is located between the fiber glass of the structural layer and an interior rubber layer. In some other aspects, the rubber layer applied to the interior side of the structural layer comprises the insulating layer.

In some aspects, the insulating layer comprises an insulation material. In some aspects the insulating layer may comprise foam board or spray foam. In another aspect the insulation may comprise fiberglass insulation. The insulating layer may be used to help retain a constant air temperature. The insulating layer also may help absorb sounds from the interior of the structure. The insulating layer may further also act as a scent barrier to help prevent scents from escaping the interior of the structure. The insulating layer may further help prevent the occupants of the blind from contacting the structural layer and thus reduces the chances of injury or skin irritation caused by the fiberglass layer. The insulating layer may further act as a sealant to help prevent natural elements such as rain or snow from breaching the interior of the blind. The insulating layer further helps provide a dark interior to the blind so that it is more difficult for wildlife to see the interior of the blind or detect any motion from the interior of the blind through one or more of the windows.

In some aspects, the blind further comprises a vegetative layer located on the exterior side of the structural layer. In some aspects, the vegetative layer is natural vegetation that has grown on the exterior of the blind structure. In some aspects, the vegetative layer is natural vegetation that has been applied to the exterior of the blind structure. In some other aspects, the vegetative layer is natural vegetation located on one or more of the ledges.

In some aspects, the blind of the present invention comprises two or more tiered ledges located between the base of the blind and the top roof structure. In some aspects, the blind of the present invention has at least three tiered ledges. In some aspects, the blind has progressively tiered-ledges such that the roof structure has a smaller cross-sectional diameter and/or area than the base of the blind. In some aspects, the blind has a ledge located between two windows.

In some aspects, the blind comprises two or more windows. In some aspects, the windows of the blind have a translucent material covering the window opening, such as glass, plexiglass or the like, that can be opened to allow the occupant to shoot a firearm or archery through the window structure. In some aspects, the translucent material swings towards the interior area in a downward, upward, or sideward direction. In some aspects, the translucent material can be a window that slides open. In some aspects, the bottom portion of the translucent material is angled towards the interior area of the blind to provide an angle such that any sunlight reflecting off of the translucent material reflects towards the ground on the outside of the blind.

In some aspects, the blind comprises camouflaged material covering the window opening. In some aspects, the camouflaged material may comprise shoot through material such that the camouflaged material does not need to be removed or moved prior to the occupant firing a firearm or shooting an arrow through the window structure.

In certain aspects the structural layer comprises fiberglass. In some aspects the structural layer comprises glass-reinforced plastic or carbon fiber. In other aspects the structural layer may comprise similarly strong yet lightweight materials such as polycarbonate or polyvinyl chloride (PVC). In some aspects the structural layer may comprise two or more layers of fiberglass separated by a reinforcing layer such as wire mesh or fencing. In some aspects the wire mesh may be galvanized poultry netting, commonly referred to as chicken wire.

In some aspects, the structural layer comprises structural ledges. The ledges may be of differing heights and depths. In some aspects, the structural layer comprises two to ten ledges. In other aspects, the structural layer comprises between about two and about eight ledges. In some aspects the ledges may be spaced at approximately equal vertical intervals of about six inches foot to about three feet apart. In other aspects, the ledges are located progressively closer together in the vertical direction from the base to the top roof structure. In some aspects, the first ledge located vertically from the base may be about six inches to about four feet from the base. In some aspects, there are at least two ledges located between the base and the windows. In some aspects, each adjacent ledge of the blind may be spaced vertically from about six to about three feet apart.

In some aspects, the depth of each ledge may be from about two inches to about six inches deep. In some aspects, the depth of the ledges near the base are deeper than the depth of the ledges near the top of the structure. In some aspects, the ledges are substantially horizontal, approximating a level plane between a front edge and a back edge. In other aspects the ledges may be angled so that the front edge of the ledge is slightly higher or lower than the rear edge of the ledge. In some aspects, the rear edge of the ledge may be between about five degrees to about fifteen degrees above or below the front edge of the ledge. In some aspects the ledges may be concave so that the midpoint of the ledge is lower than the front and rear portions of the ledge. In some other aspects, the ledge may have a concave configuration to hold earthen material, such as dirt, and be used as planters for vegetation.

In certain aspects the structural ledges may go around the entire structure at nearly the same height. In some aspects the structural ledges may be staggered so that a ledge does not go around the entire structure. In some aspects, a single structural ledge may be the same height or it may start at one height and slope upward and/or downward as it traverses the circumference of the structure. In some aspects, the structural ledges do not go around the entire blind, but instead, stop proximate the door location. In some aspects, the respective structural ledges are about the same height proximate both sides of the door.

In some aspects, the structural layer comprises a large amorphous structure with no defined ledges or ledges at variable intervals.

In operation, the structural layer provides a lightweight but strong material which gives the blind its basic form and helps the structure retain its shape. The strength of the structural layer allows the surface and vegetative layers to be applied. The structural layer provides the basic shelter so that hunters and other wildlife observers have a safe place to observe animals. In aspects with a wire mesh between multiple layers of fiberglass, the wire mesh acts to provide additional strength to the structural layer.

In certain aspects the surface layer comprises a gel coating. In some aspects the surface layer comprises a dark colored gel coating. In some aspects the surface layer comprises pebbles and other rocks. Further, in some aspects the surface layer comprises multiple layers of gel coating. In some aspects at least one layer of gel coating may be sandblasted to provide a rough surface for the earthen material to be applied. In some aspects, a second gel coating is applied over the earthen material.

In operation, the surface layer provides a hard surface for the vegetative layer to grow upon. The surface layer provides a nonporous surface which helps prevent water from reaching the structural layer and insulating layer. The surface layer also gives the blind a dark outer appearance which reduces the amount of light reflected to wildlife. In some aspects, the surface layer has a rock-like surface texture such that the blind has the appearance of a large rock or boulder.

In certain aspects the outer vegetative layer comprises earthen material and natural vegetation. The earthen material may be applied via a lacquer or may be rubbed on. The earthen material may comprise dirt, pebbles, rocks, and similar materials. In some aspects, the vegetative layer comprises vines or other crawling plants. In some aspects the vegetative layer comprises flowers, shrubs, weeds, and other natural vegetation.

In certain aspects the blind is prefabricated as a single structure which does not require any assembly. In some aspects the blind comprises two or more sections which are fastened together. In some aspects, the blind comprises a fastening means to combine the one or more sections, the fastening means comprising a clasp, hinge, hook, nuts-and-bolts, or the like.

The blind comprises at least one window opening. In certain aspects, the blind comprises two sections operably coupled together, with each section having two window openings. In some aspects, the blind comprises a single section with four window openings. In some aspects with more than one window opening, the window openings are of equal size; in other aspects with more than one window opening, the window openings may be different sizes. In some aspects, the window openings are about one foot to about three feet wide and about six inches to about two feet tall. In some aspects the window openings are rectangular, in others the window opening may be oblong or circular.

In some aspects, the at least one window opening is an open hole between the interior area and the exterior. In some aspects, the at least one window comprises a pane of transparent or translucent material. The transparent or translucent material may comprise glass, plexi-glass, hard plastic, or other similar materials. In some aspects the transparent or translucent window pane is angled so that light hitting the window is reflected downward towards the ground rather than reflected out towards the wildlife. In some aspects, the window structure comprises a window pane and a hinging device. In some aspects, the angle of the window pane may be between about five and about thirty degrees. In some aspects, the angle of the at least one window is fixed. In some aspects the angle of the at least one window may be manipulated and changed.

In certain aspects, the window structure comprises mesh screens which may be removable. In some aspects the mesh screens may comprise "shoot-through" screens. In some aspects, the window structure comprises an opaque window covering wherein the opaque window covering comprises rubber or dark fabric. In some aspects, the opaque window covering may be attached to the blind itself. In other aspects, the opaque window covering may be completely detachable from the blind. In some aspects, the window comprises a rubber or foam seal.

In operation, the window may be angled to reflect light downward so that it is more difficult for wildlife to see into the blind while the observer inside the blind is still able to see out. The opaque window covering prevents light from entering or exiting the blind when an observer inside the blind does not wish to see out a particular window. The seal helps provide an airtight border between the window pane and structure of the blind, which helps prevent sounds and scents from escaping, as well as helping to prevent weather elements such as rain, sleet, or snow from entering the blind. The mesh screens allow the observer to keep the window open while preventing insects and wildlife from entering the blind. The mesh screens also helps prevent wildlife from seeing inside the blind. In aspects where the window structure includes a window pane and hinge, the window pane may be moved to allow a hunter to fire a weapon through the window opening.

The blind comprises at least one doorway. In some aspects the blind is comprised of a single doorway on one section of the blind. In some aspects, the blind comprises two sections wherein each section comprises a doorway; when the sections are joined, the sections of the door align to create a single larger doorway. In some aspects, the at least one doorway is between about two feet to about four feet wide. In some aspects, the at least one doorway is between about forty-eight inches tall and about seventy-two inches tall. The doorway of the blind may be rectangular, oblong, circular, rectangular, or the like.

In some aspects the doorway is an open space with no physical structure to open and close. In some aspects, the doorway comprises a physical door structure. In certain aspects the door structure may rest upon the blind without being physically connected. In some aspects, the door may be connected via a connecting device comprising a clasp, hinge, hook, or similar device. In other aspects, the door structure may slide into the doorway along tracks or grooves in the blind. In some aspects the door structure may comprise a translucent or transparent material. In other aspects, the door structure may comprise an opaque material. In some aspects, the door structure may be formed from a mold similar to the rest of the blind. In some aspects, the door structure comprises structural ledges in the same manner as described above herein.

The blind may come in various dimensions. In certain aspects, the base of the blind is nearly circular. In other aspects, the base of the blind may be oblong, rectangular. In some other aspects, the base of the blind has between about four to about 12 sides, such as an octagon or hexagon like-shape. In some aspects, the base of the blind comprises a diameter of between about five feet and about twelve feet. In some aspects, the height of the blind is between about five feet and about ten feet. In some aspects, the diameter of the blind at the midpoint in vertical height is between about four feet and about ten feet. In a preferred embodiment, the blind has a base diameter of about eight feet, a height of about seven feet, and a diameter of about seven feet where the height of the blind is about four feet tall.

In some aspects, the roof structure of the blind is substantially flat. In some other aspects, the roof structure of the blind has a domed-like structure. In some aspects, the roof structure of the blind has a rock-like surface texture.

The blind may be produced by using a prefabricated mold. The prefabricated mold may be a single mold, or may comprise separate molds for different sections of the structure. The mold may be created using any building material such as fiberglass, aluminum or plywood. The pieces of building material may be connected via fasteners such as screws or via an adhesive to form the mold. In the preferred method, the mold comprises segments of fiberglass which are fastened together with screws and bolts.

Once the mold has been created, the insulating layer, structural layer, and surface may be applied to the mold one layer at a time. In the preferred method, a gel coat layer is applied to the inside of the mold, such as by spraying to create the first level of the surface layer. Then a layer of fiberglass is applied to the surface layer and allowed to harden over a period of time to create the structural layer. Mesh wiring and/or additional layers of fiberglass may be layered upon the initial layer of fiberglass to create an even stronger structural layer. The insulating layer may be applied while the structural layer and surface layer are still inside the mold, or may be applied after removing the structural layer and surface layer from the mold.

In some aspects, the prefabricated mold may have inserts for the door and the at least one window. In some other aspects, the window openings and/or door openings are cut into the structural layer after being removed from the mold. In some other aspects, the mold may be a single contiguous structure to provide a single contiguous structural layer such that the door and the at least one window are cut out after the structure has been removed from the mold.

Once the structural layer and surface layer are removed from the mold, the exterior portion of the surface layer may be sandblasted to give it a rough feel and appearance. Another layer of gel coating may be applied to the surface layer, either by brushing or spraying the gel coating onto the surface layer.

After applying a second layer of gel coating to the surface layer, earthen material such as small rocks, pebbles, sand, and/or dirt may be applied to the surface layer. In the preferred method, pebbles and sand are applied to the ledges after the second layer of gel coating has been applied. Then another layer of gel coating is applied by either spray or brush to lock the objects onto the surface layer. Then dirt is applied to the surface layer. Finally, after the dirt has been applied to the surface layer, a layer of wax curing agent is applied onto the surface layer to provide a hard exterior finish to the structure.

The vegetative layer of dirt and plants may be applied by the user after the structure has been purchased and put into the observational post so that the vegetation may grow and the blind can become part of the natural landscape.

In other aspects, the vegetative layer may be applied to the exterior surface with the earthen material or in place of the earthen material.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

Figure 1:
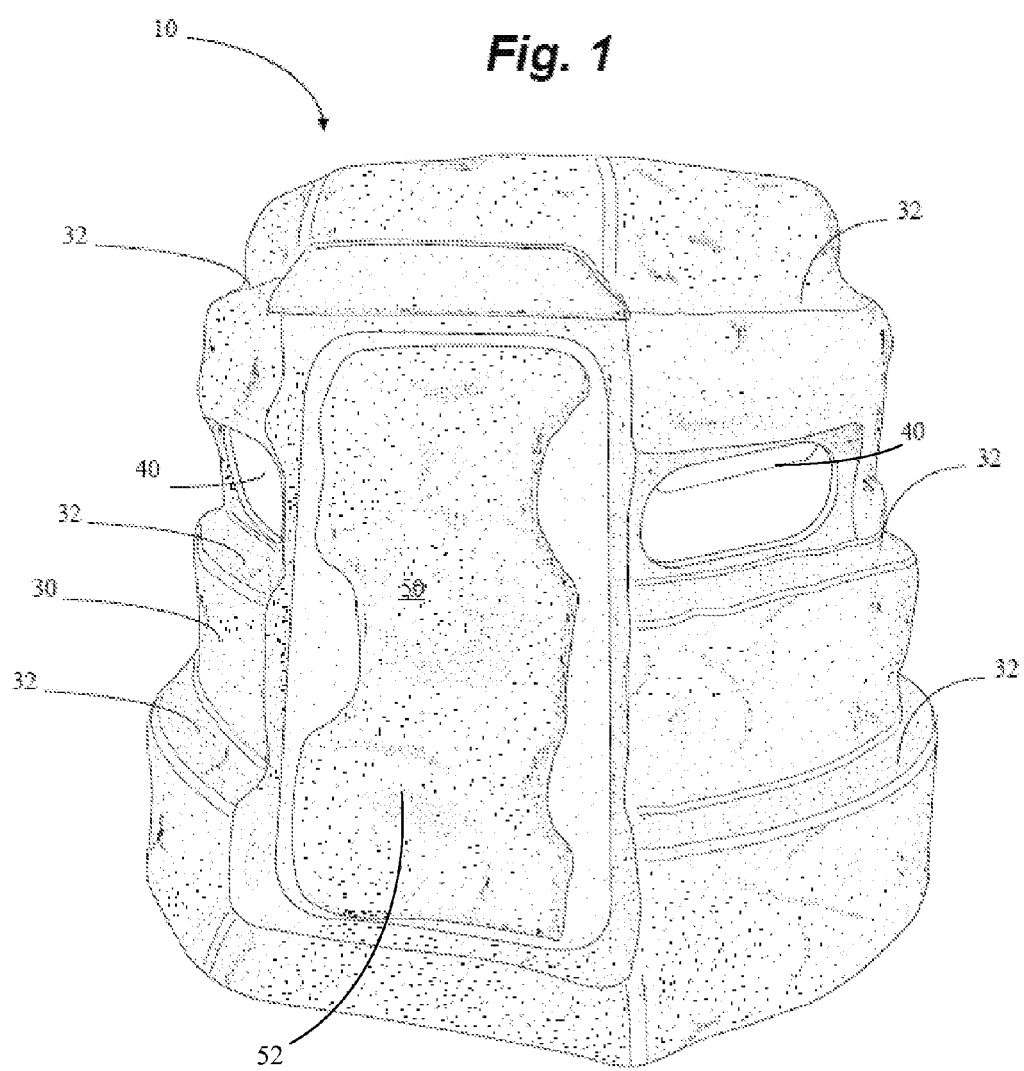
FIG. 1 is a perspective view of the tiered-ledge blind structure according to certain aspects of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Embodiments of the present invention are discussed in detail below. In describing embodiments, specific terminology is employed for the sake of clarity. However, the present invention is not intended to be limited to the specific terminology so selected. A person skilled in the relevant art will recognize that other equivalent parts can be employed and other methods developed without parting from the spirit and scope of the present invention.

Referring now to the figures, the hunting blind 10 and mold 100 of the present invention are each illustrated with the aid of figures.

In certain aspects, the hunting blind 10 of the present invention can be manufactured using a mold, the mold comprising one or mold sections. In some aspects, the mold comprises a plurality of fiberglass sections fastened together with fasteners to form each mold section. The mold sections can comprise one or more structural aspects of the hunting blind 10, including one or more structural ledges, one or more window openings, and one or more doorways. For instance, one particular mold section of the mold may comprise tiered structural ledges and a window opening on one of the tiered structural ledges. As one of ordinary skill in the art will appreciate, the plurality of fiberglass sections may be fastened together in various configurations to define one or more mold sections. In some aspects, the mold sections are fastened together to form a single mold. The mold comprises the configuration and contours of the desired hunting blind 10, which is constructed in certain aspects by molding fiberglass material within the mold. The hunting blind 10 shall now be discussed in more detail.

Figure 2:
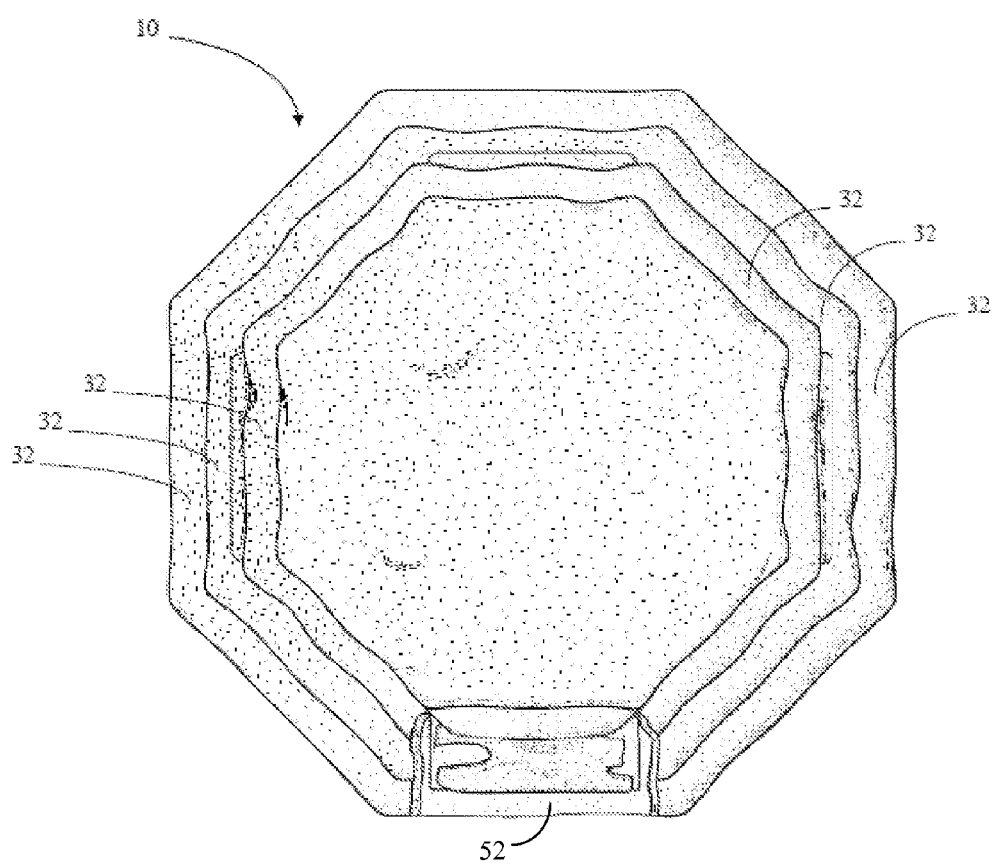
FIG. 2 is a top view of the tiered-ledge blind of FIG. 1.
Figure 3:
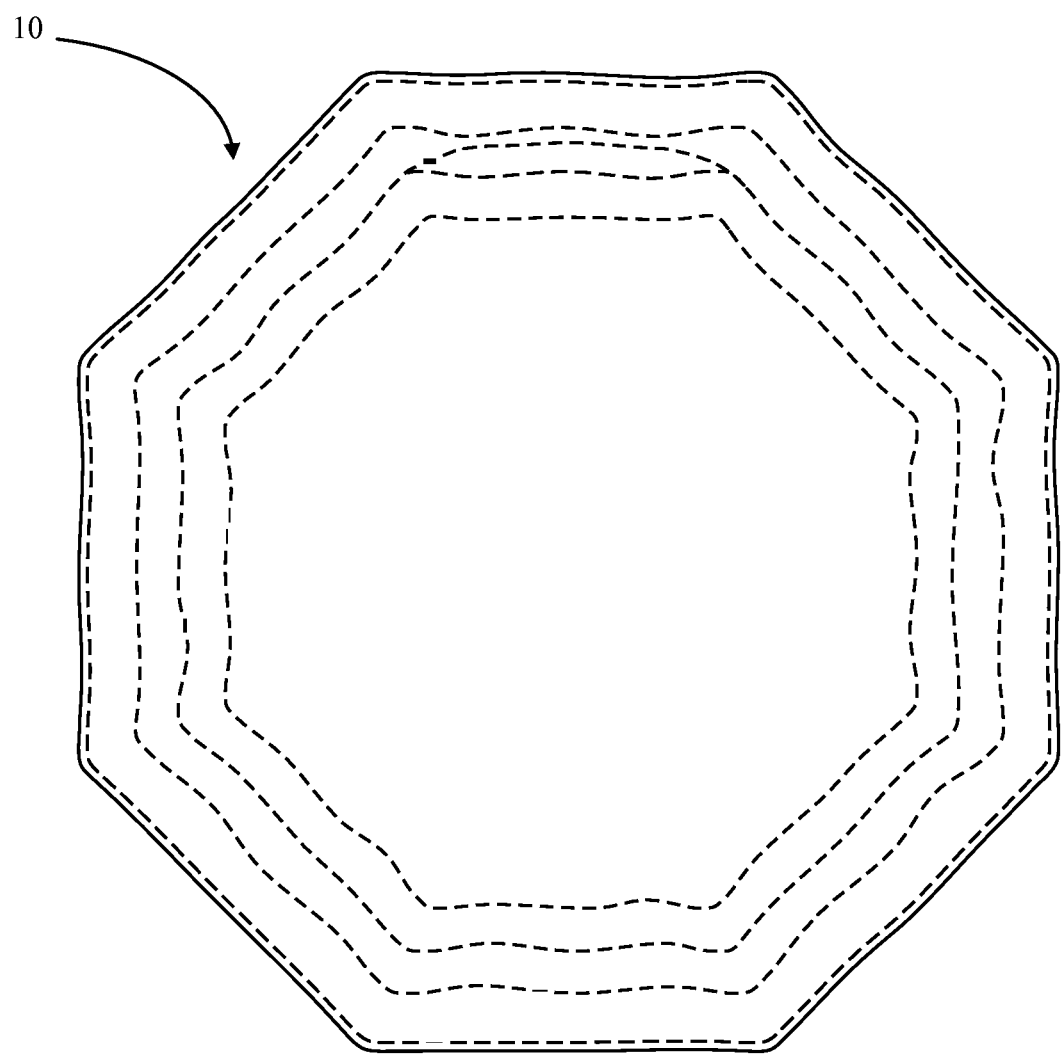
FIG. 3 is a bottom view of the tiered-ledge blind of FIG. 1.
Figure 4:
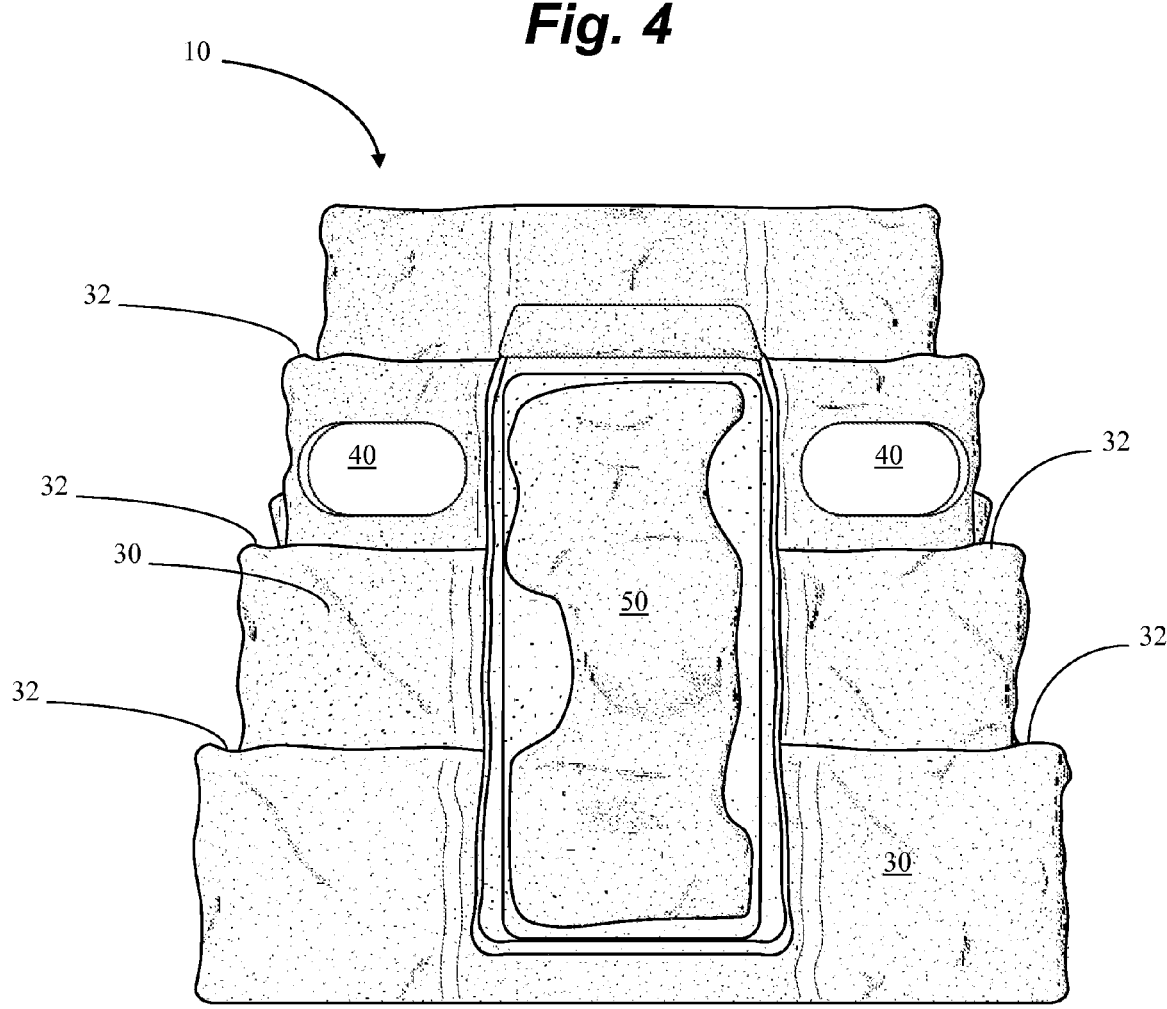
FIG. 4 is a side view of the tiered-ledge blind of FIG. 1, showing a door structure located between two of the windows.
Figure 5:
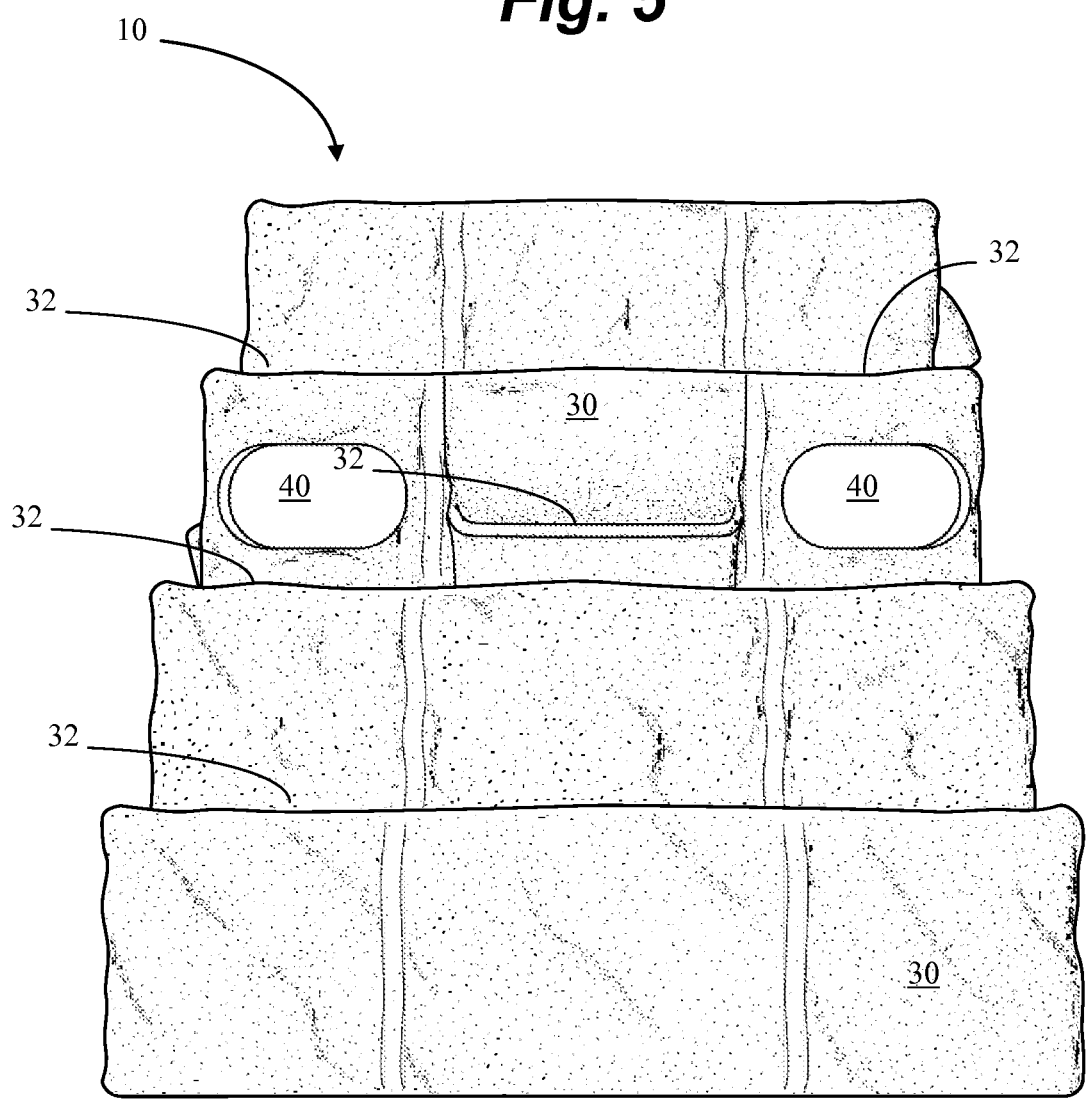
FIG. 5 is another side view of the tiered-ledge blind of FIG. 1, showing a ledge located between two of the windows.
Figure 6:
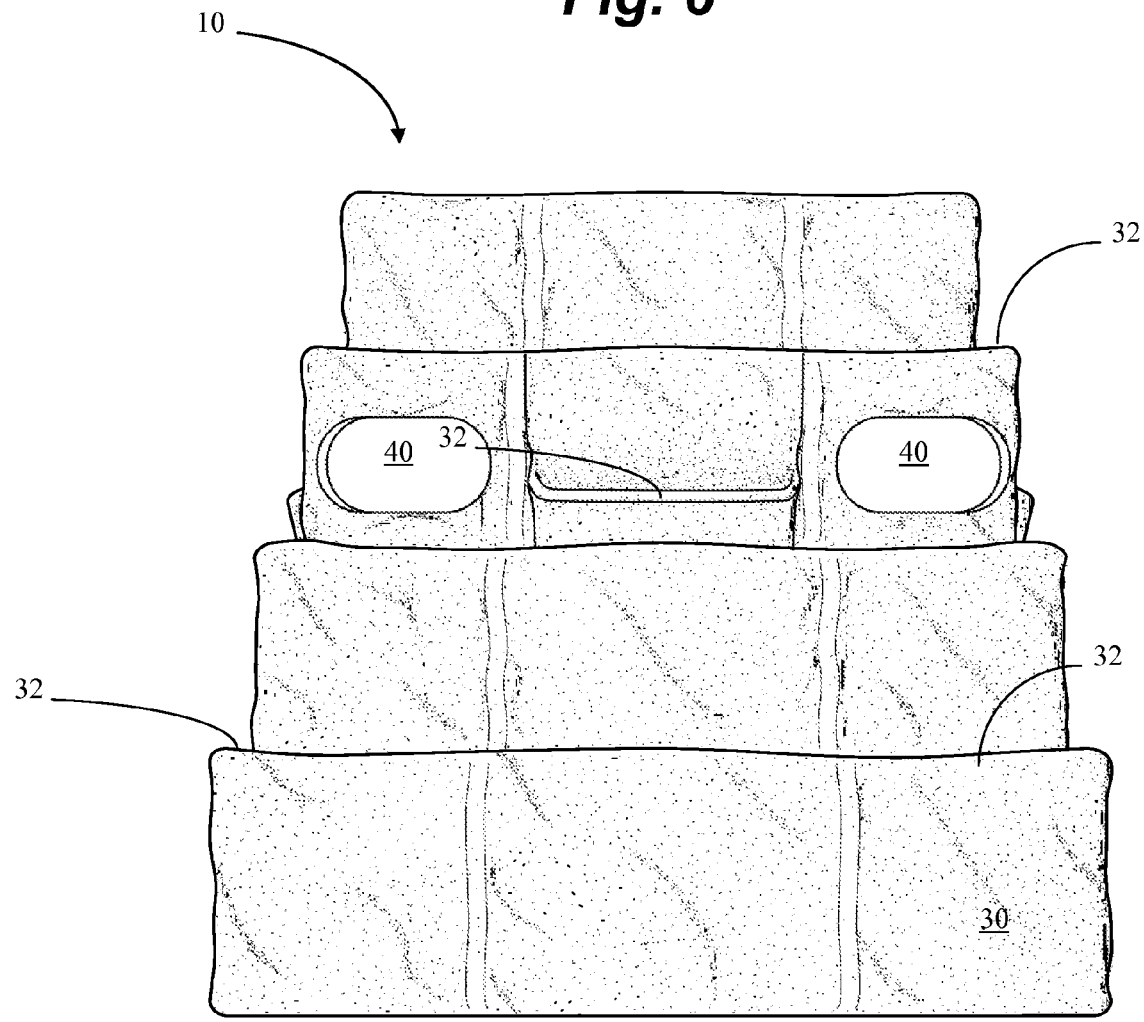
FIG. 6 is another side view of the tiered-ledge blind of FIG. 1, showing a ledge located between two of the windows.
Figure 7:
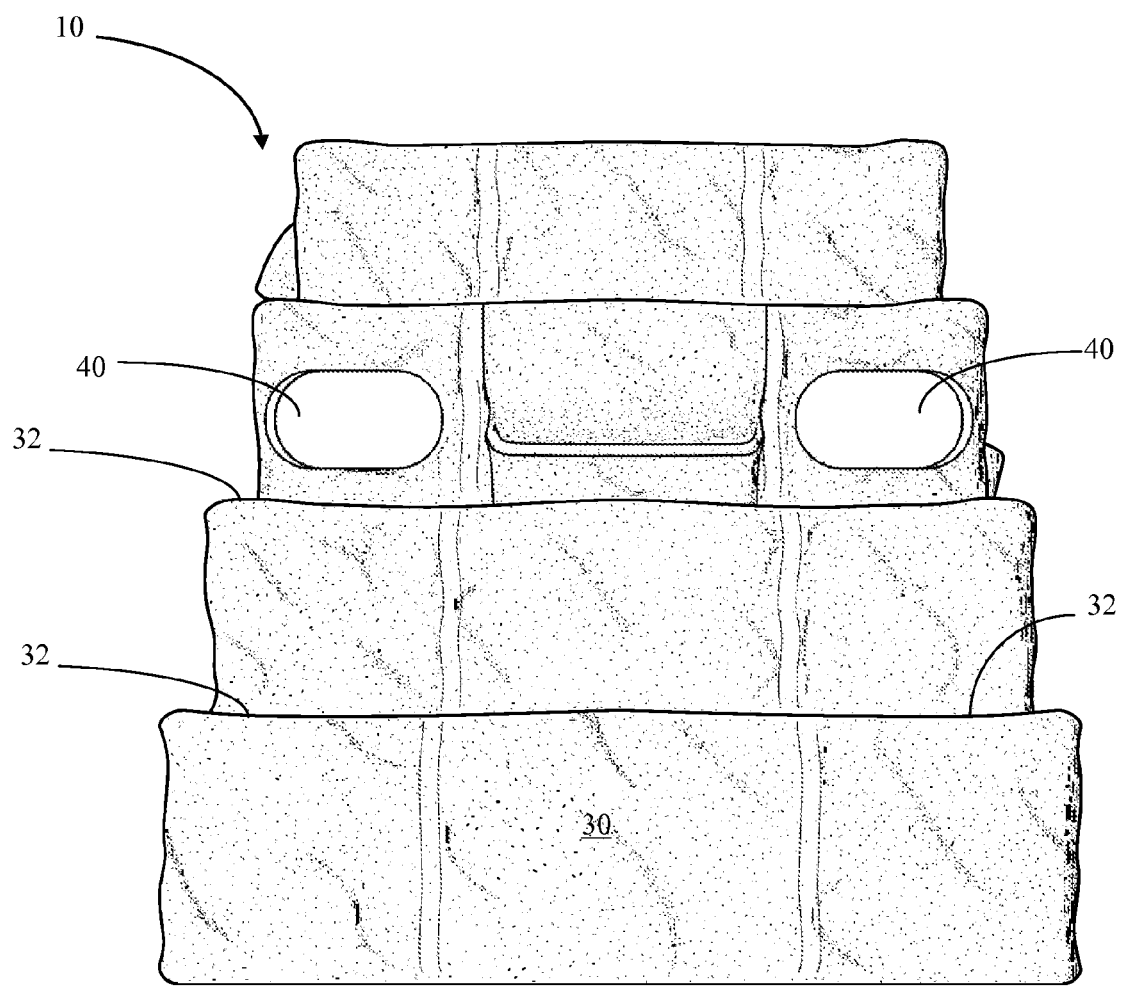
FIG. 7 is another side view of the tiered-ledge blind of FIG. 1, showing a ledge located between two of the windows.
Figure 8:
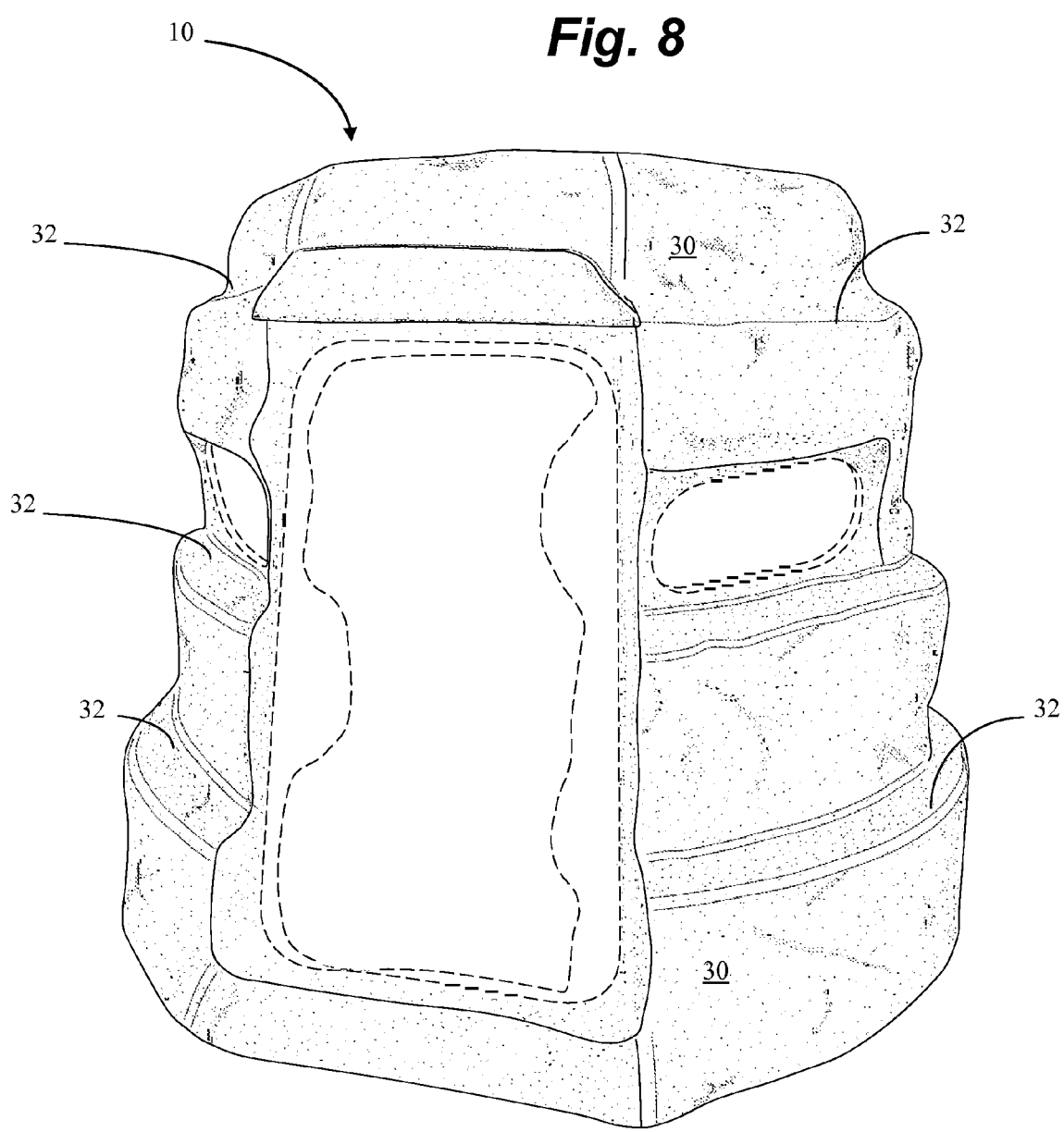
FIG. 8 is a perspective view of the tiered-ledge blind structure according to certain aspects of the present invention.
Figure 9:
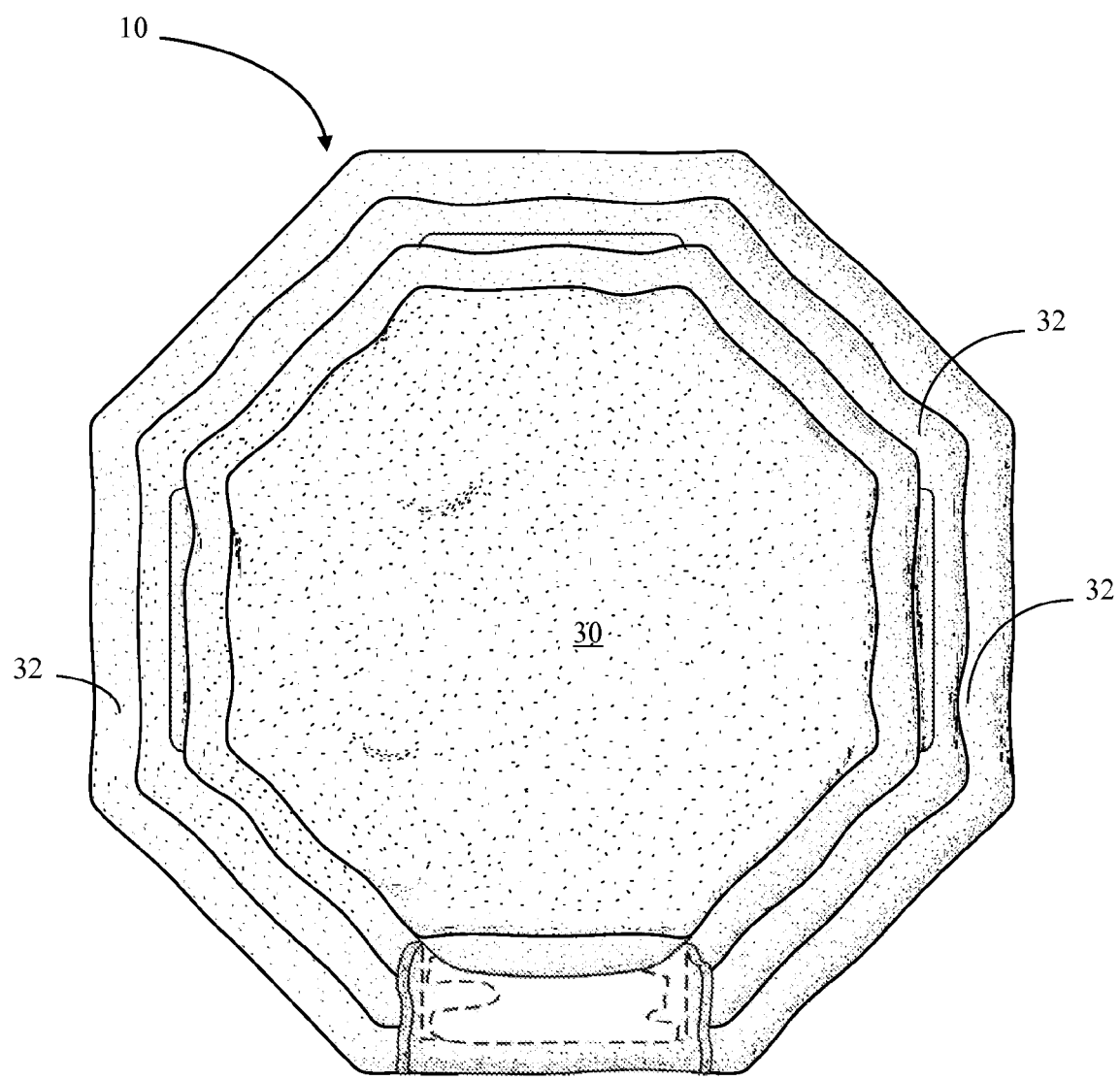
FIG. 9 is a top view of the tiered-ledge blind of FIG. 8.
Figure 10:
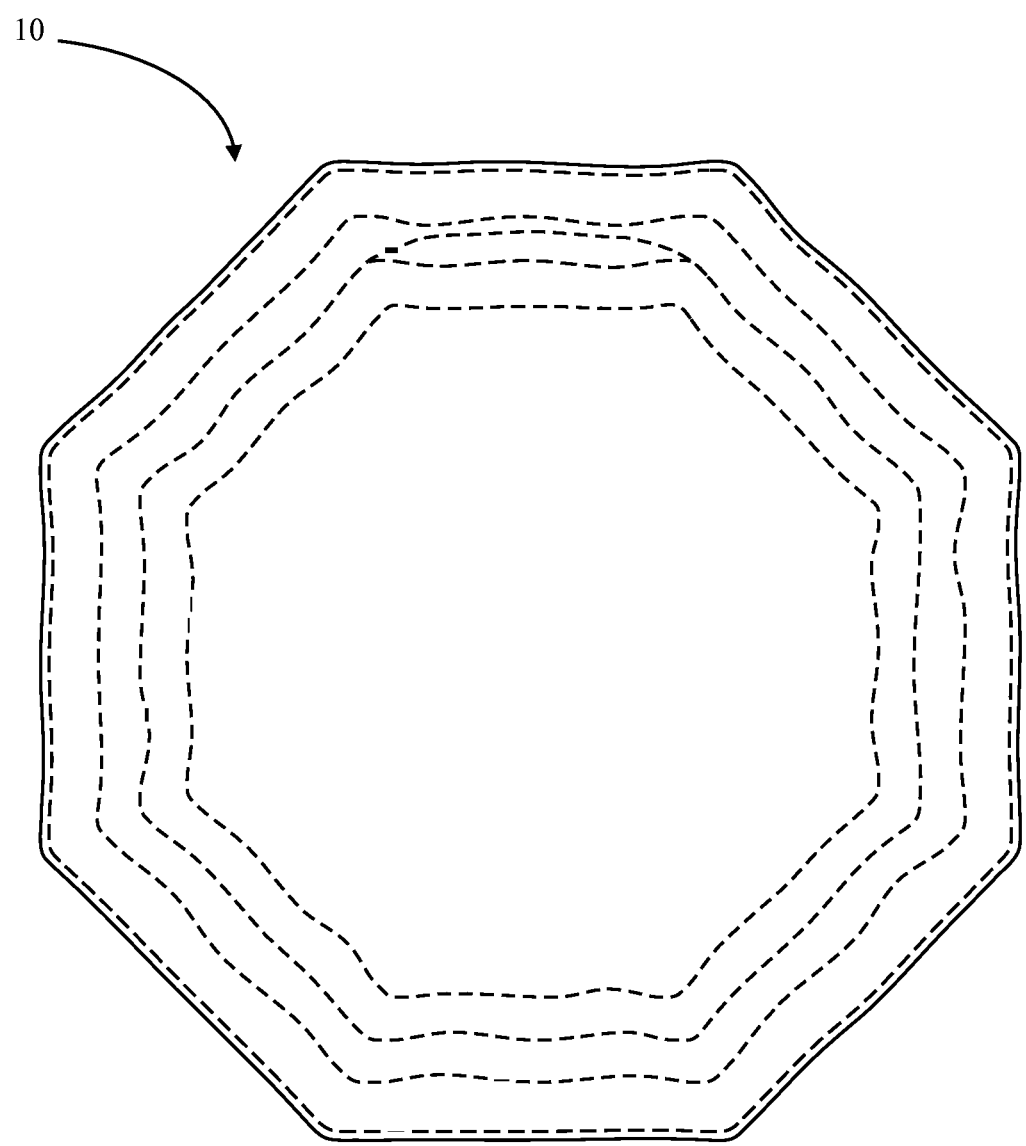
FIG. 10 is a bottom view of the tiered-ledge blind of FIG. 8.
Figure 11:
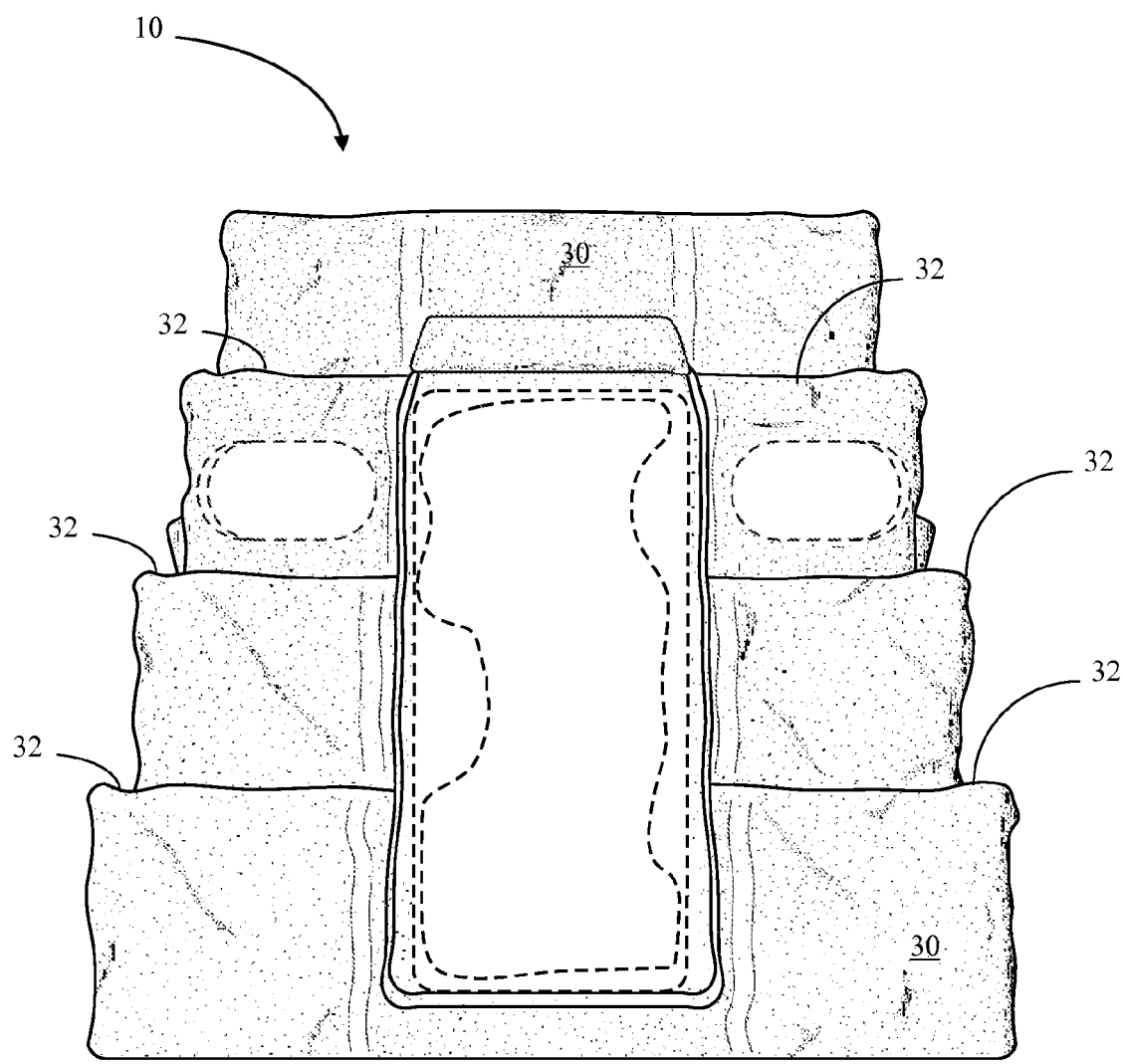
FIG. 11 is a side view of the tiered-ledge blind of FIG. 8.
Figure 12:
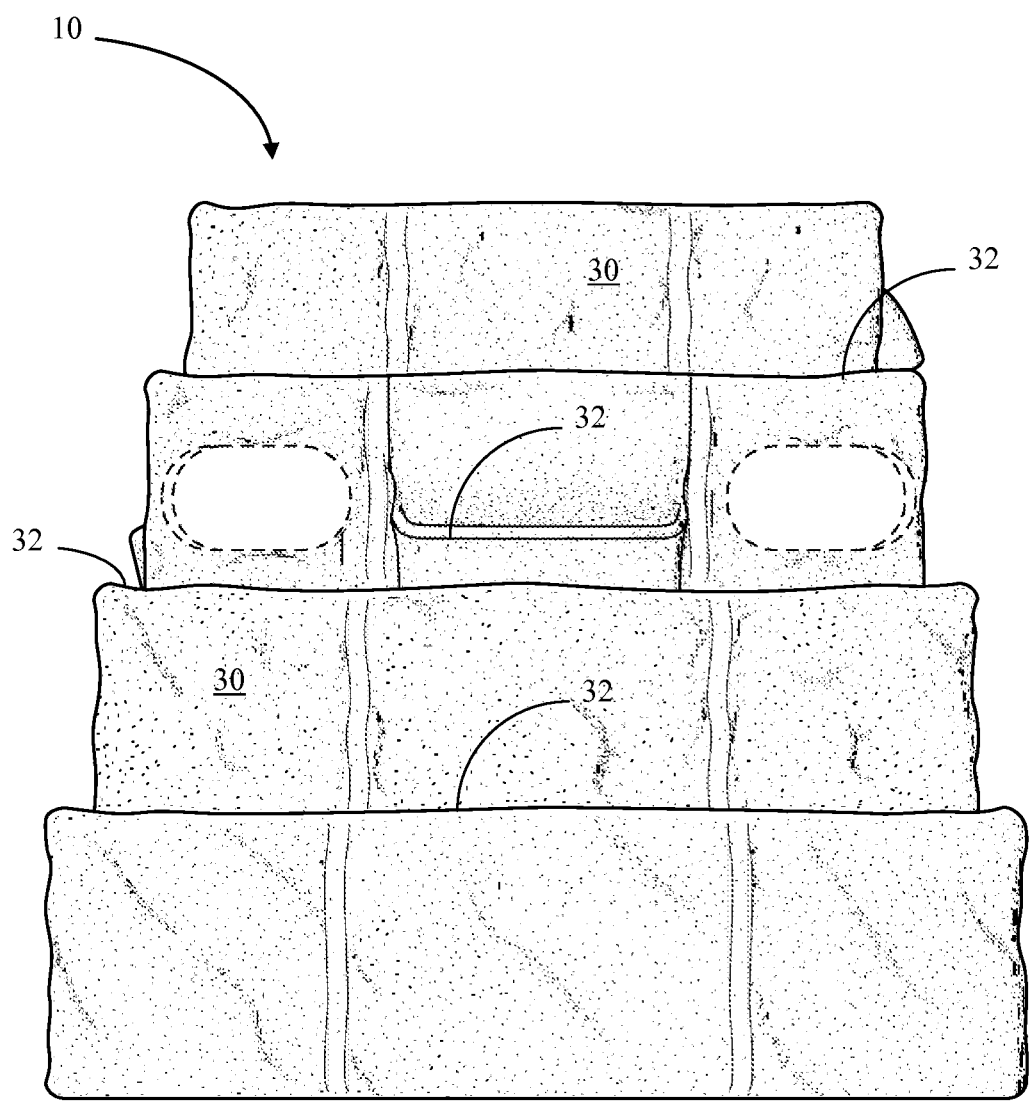
FIG. 12 is another side view of the tiered-ledge blind of FIG. 8.
Figure 13:
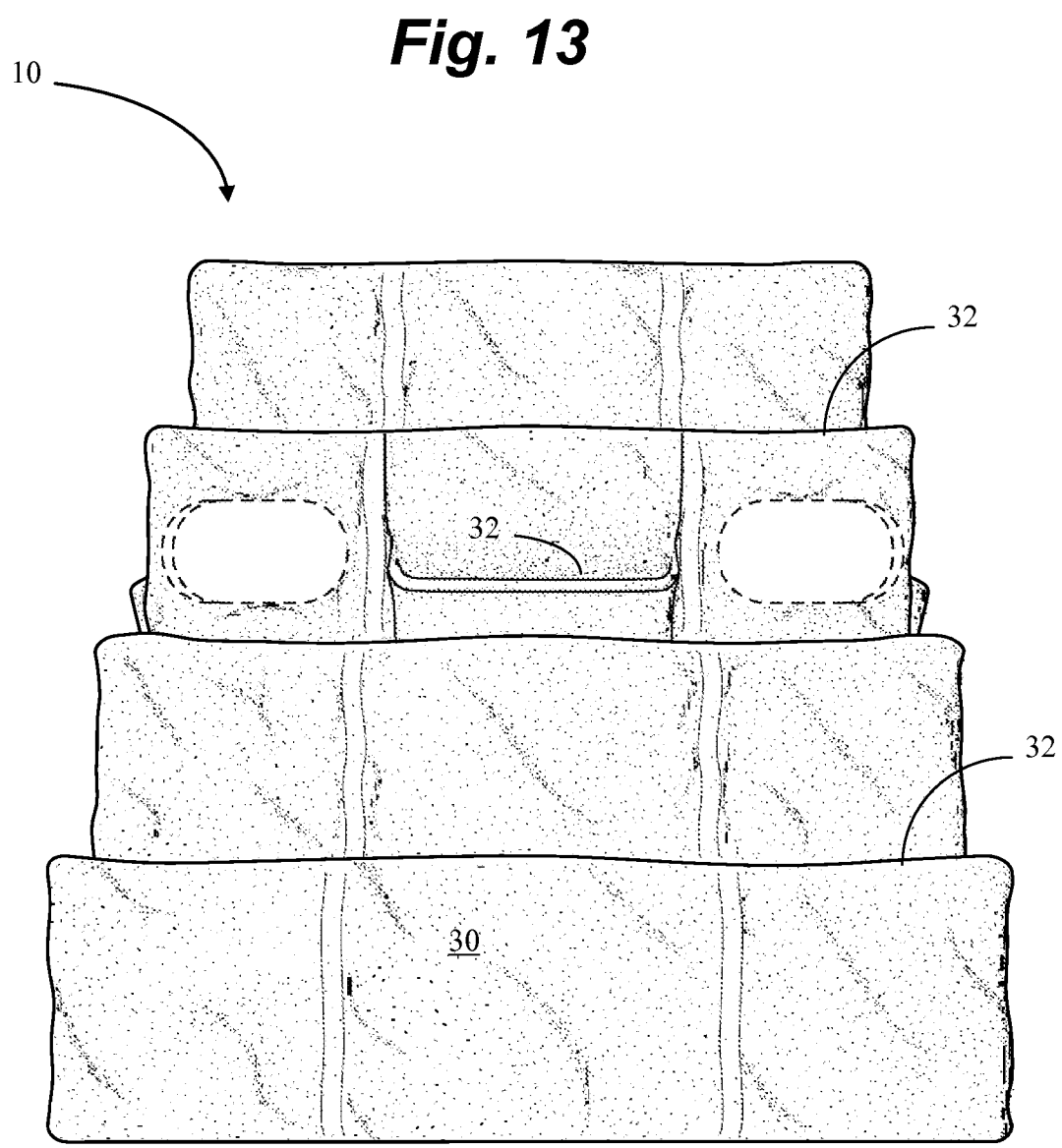
FIG. 13 is another side view of the tiered-ledge blind of FIG. 8.
Figure 14:
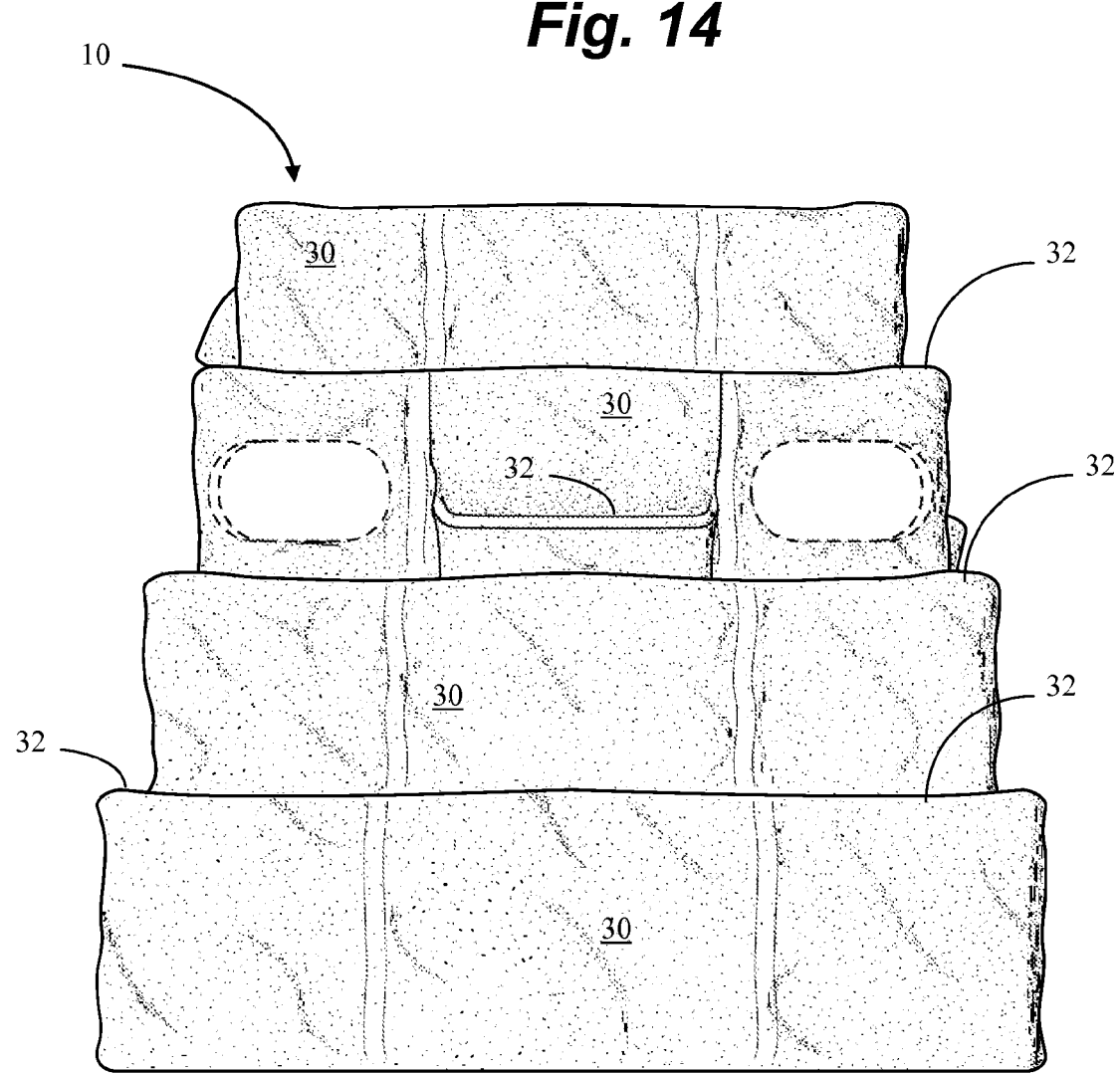
FIG. 14 is another side view of the tiered-ledge blind of FIG. 8.

Referring generally to FIGS. 1-14, the tiered-ledge hunting blind 10 of the present invention comprises an exterior earthen appearance 30 with structural ledges 32, one or more window openings 40, and doorway 50. In certain aspects, blind 10 comprises two separate blind sections, which are operably connected via fasten meanings. Blind section 20 of blind 10 comprises structural ledges 32, window opening 40, and doorway 50. Blind section 25 of blind 10 comprises structural ledges 30 and window opening 40. In some aspects, doorway 50 comprises door structure 52, wherein door structure 52 also comprises structural ledges 30, as best shown in FIGS. 1-2.

In certain aspects, blind 10 is approximately eight feet in diameter at the base, approximately seven feet tall, and the diameter of blind 10 is approximately seven feet where blind 10 is approximately four feet in height. Other heights and diameters are also contemplated without departing from the spirit of the present invention. In some aspects, the height of the blind is between about five feet and about ten feet. In some aspects, the diameter of the blind at the base is about five feet to about twelve feet. In some aspects, the diameter of the blind at the midpoint in vertical height is between about four feet and about ten feet.

In FIGS. 1-14, blind 10 is shown to comprise four prominent structural ledges 32 with one such ledge 32 located mid-way another structure ledge 32 between window openings 40, although more or less ledges 32 are contemplated. The structural ledge 32 may comprise earthen material, such as rocks, pebbles, dirt, sand or mixtures thereof. In some aspects, structural ledges 32 are vertically spaced every about eighteen inches to about twenty-four inches. In some aspects, each structural ledge 32 is about three to about six inches deep from the front structural face of the hunting blind 10 to the next front structural face.

In certain aspects, window structure 40 comprises an open structure. In some aspects, window opening may comprise a window pane, hinge, opaque covering, mesh screen, and/or rubber seal. In some aspects, window pane comprises a transparent or translucent material, such as glass or plexiglass.

In certain aspects, doorway 50 comprises a door structure that fits within the doorway opening, the door structure fastened to the hunting blind 10 by a hinge and rubber seal that surrounds the door opening and/or door structure. In some aspects, doorway 50 comprises a door track instead of a hinge. In some aspects, the door structure of the doorway 50 comprises at least one structural ledge 32 wherein each structural ledge 32 may comprise earthen material. In some aspects, doorway 50 is approximately thirty two inches wide and approximately sixty inches tall, while different widths and heights of the doorway are contemplated herein.

In certain aspects, blind 10 comprises an interior insulating layer, a structural layer, an outer surface layer, and a vegetative or natural material layer. In some aspects, the interior insulating layer comprises black rubber coating.

As shown in FIG. 1, the window 40 of the blind is provided at an angle such that any window pane reflects any sunlight towards the exterior surface and downward toward the surrounding earthen flooring. The doorway 50 may also have a structural overhang to help protect from inclement weather elements.

In some aspects, the blind 10 of the present invention may have a more circular-octagon structure at the base and a more defined octagon-like structure at the roof structure.

As provided above, the blind 10 may be produced by using a prefabricated mold. In some aspects, a first gel coat layer is applied to the inside of the mold, such as by spraying to create a first surface layer. Then a layer of fiberglass is applied to the first surface layer and allowed to dry for a period of time to harden and create a structural layer. In some optional steps, mesh wiring and/or additional layers of fiberglass may be layered upon the initial layer of fiberglass to create an even stronger structural layer. After the structural layer is provided, an interior insulating layer may be applied while the structural layer is still inside the mold, or may be applied after removing the structural layer and surface layer from the mold. In either instance, the structural layer is eventually removed from the mold.

Once the structural layer is removed from the mold, the exterior portion of the surface layer may be sandblasted to provide a roughened external surface. A second layer of gel coating may be applied to the sandblasted external surface, which may be applied by brushing or spraying the gel coating onto the sandblasted external surface.

After applying the second layer of gel coating, earthen material such as small rocks, pebbles, sand, and/or dirt may be applied to the external surface layer. In the preferred method, pebbles and sand are applied to the ledges after the second layer of gel coating has been applied. Then a third layer of gel coating is applied by either spray or brush to lock the objects onto the surface layer. Then dirt is applied to the external surface layer. Finally, after the dirt has been applied to the external surface layer, a layer of wax curing agent is applied onto the external surface layer to provide a hard exterior finish to the structure. In some aspects, the earthen material may be applied after the second layer of gel coating followed by the application of the wax curing agent layer. In some other aspects, a vegetative material may also be applied with the earthen material or in lieu of the earthen material.

The vegetative layer or an additional vegetative layer may be applied by the user after the structure has been purchased and put into the observational post so that the vegetation may grow and the blind can become part of the natural landscape.

In some aspects, site specific earthen material and/or vegetative material may be applied to the blind. For instance, a specific hunting/observation area may have a site specific earthen material such as red clay to be applied to hunting blind. Other site specific earthen materials may include black dirt, sand, field stone, river rock pebbles or the like. Similarly, site specific vegetative material may be applied to the hunting blind, such as coniferous needles, deciduous leaves, weeds, wildflowers, agricultural plants material, such as corn, wheat, soybean, and the like.

In other aspects, the vegetative layer may be applied to the exterior surface with the earthen material or in place of the earthen material. As shall be appreciated, the exterior surface of the blind 10 may comprise any desired earthen material and/or vegetative material to be site specific to become part of the natural landscape.

The invention claimed is:

1. A blind structure comprising:
   at least one structural layer defining an interior area for an occupant and an exterior surface, wherein said at least one structural layer configured to have a plurality sides having a plurality of progressively tiered ledges, a gelcoat layer located on an outer surface of said at least one structural layer, wherein said at least one structural layer having one or more window openings on said plurality of sides and wherein a natural earthen material is adhered to said exterior surface defining an outer earthen surface layer.

2. The blind structure of claim 1, wherein the at least one structural layer comprises one or more layers of fiberglass.

3. The blind structure of claim 1, wherein said natural earthen material is chosen from dirt, rocks, pebbles, sand, and combinations thereof.

4. The blind structure of claim 1, further comprising a natural earthen material adhered to an exterior surface of said gelcoat layer, said natural earthen material defining an outer earthen surface layer.

5. The blind structure of claim 4, wherein said natural earthen material is chosen from dirt, rocks, pebbles, sand, and combinations thereof.

6. The blind structure of claim 1, further comprising an interior layer overlaying an interior surface of said at least one structural layer.

7. The blind structure of claim 4, wherein said interior layer comprises a rubber material.

8. The blind structure of claim 1, further comprising an insulating layer located on the interior area side of the structural layer.

9. The blind structure of claim 8, wherein said insulating layer being located between said at least one structural layer and an interior rubber layer.

10. The blind structure of claim 1, wherein said plurality of progressively tiered ledges provide a roof structure having a smaller cross-sectional span diameter than a base of the blind.

11. The blind structure of claim 1, further comprising a doorway.

12. The blind structure of claim 1, wherein said one or more windows have a translucent material covering a window opening, said translucent material chosen from glass, an acrylic sheet and plastic film.

13. The blind structure of claim 1, wherein said one or more windows are angled such that sunlight reflecting from a translucent material covering a window opening reflects downwards toward the surrounding ground.

14. The blind structure of claim 1, wherein said one or more windows have a translucent material covering a window opening, said translucent material capable of swinging towards said interior area in a downward, upward or sideward direction.

15. The blind structure of claim 1, wherein said plurality of progressively tiered ledges have a width between about two inches to about six inches.

16. The blind structure of claim 1, wherein said plurality of sides have a vertical height between about six inches and about three feet.

17. A blind structure comprising:
   a structural layer comprising a structure layer located between an interior rubber layer and an exterior gelcoat layer, said structural layer defining an interior area for an occupant and an exterior surface, wherein said structural layer configured to have a plurality of sides portions separated by a plurality of progressively tiered ledges, and wherein said structural layer having one or more window openings on said plurality of sides.

18. A blind structure comprising:
   a structural layer comprising a structure layer located between an interior rubber layer and an exterior gelcoat layer, said structural layer defining an interior area for an occupant and an exterior surface, wherein said structural layer configured to have a plurality of sides portions separated by a plurality of progressively tiered ledges, wherein the structural layer having one or more window openings on said plurality of sides, wherein said structural layer having at least one doorway, and wherein a natural earthen material chosen from dirt, rocks, sand and mixtures thereof is adhered to said exterior gelcoat layer.

* * * * *